Figures 1, 2:
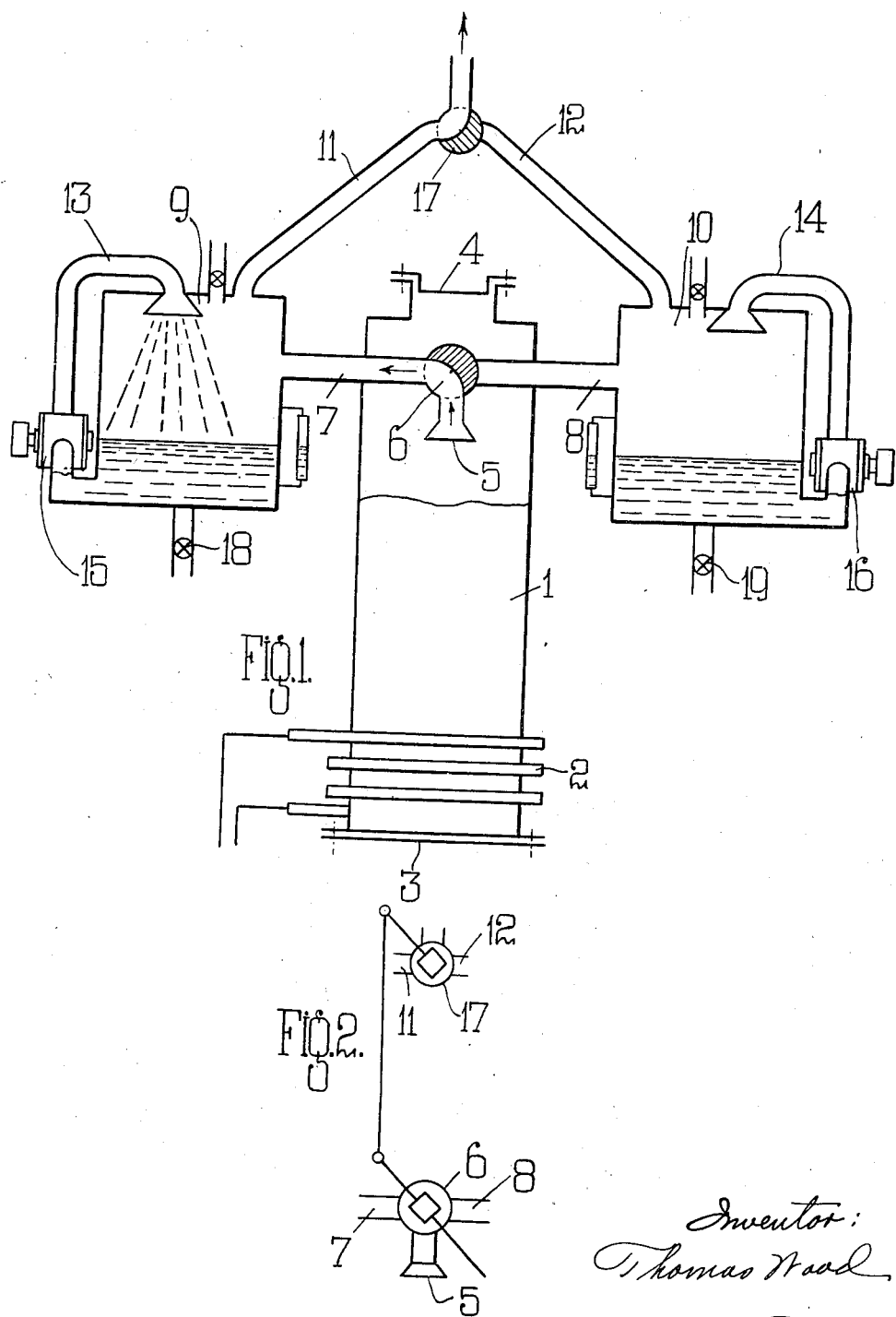

May 14, 1940. T. WOOD 2,200,906
MANUFACTURE OF ALKALI METALS AND ALKALI METAL HYDROXIDES
Filed Nov. 10, 1937

Inventor:
Thomas Wood
By: Mason & Porter
Attorneys

Patented May 14, 1940

2,200,906

UNITED STATES PATENT OFFICE 2,200,906

MANUFACTURE OF ALKALI METALS AND ALKALI METAL HYDROXIDES

Thomas Wood, St. Helens, England

Application November 10, 1937, Serial No. 173,946
In Great Britain November 12, 1936

8 Claims. (Cl. 23—184)

This invention relates to a new or improved process for the manufacture of alkali metals or alkali metal hydroxides.

The process is particularly applicable to the manufacture of caustic soda, and provides a method which is rapid and economical and gives a product of a high degree of purity.

Numerous methods have been proposed for the manufacture of caustic soda. Some of these require two or more separate stages in the manufacture and some of them necessitate purification of the caustic soda produced. The present invention enables caustic soda of a high degree of purity to be produced by what is in effect a single operation.

According to the present invention, an alkali metal salt, especially the chloride, such as common salt, is mixed with a non-volatile base such as lime, and with a solid reducing agent, preferably one which is a conductor of electricity such as coke, and the mixture is heated with exclusion of air and under reduced pressure preferably in an induction furnace. In this way, the alkali metal is liberated and volatilized off under the reduced pressure. It can be collected and condensed as metal, if desired, but is preferably brought into reaction with water to form alkali metal hydroxide. It may be absorbed in a suitable absorbing medium, preferably water, or dilute alkali.

By chemical reaction of the alkali metal with the water the alkali hydroxide is produced in solution and hydrogen is liberated and the gases drawn off may be subsequently treated for the recovery or utilization of the reducing gases, including hydrogen, which they may contain. Such reducing gases may be burnt in the boiler furnaces or under evaporators for the alkali hydroxide or under driers for drying the initial materials.

The accompanying drawing Fig. 1 shows one form of apparatus, in diagrammatic elevation, suitable for carrying out the present invention and Fig. 2 shows a detail, also in diagrammatic elevation of valve mechanism.

In a preferred form of the invention, a mixture of coke and common salt and lime is fed into a cupola 1 surrounded by a floating coil 2 in a high frequency electric circuit (not shown), so that the temperature of the coke in the mixture is suitably raised to bring about a reaction between the ingredients. The coke may be raised to incandescence. The following reaction takes place:

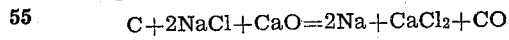

$$C + 2NaCl + CaO = 2Na + CaCl_2 + CO$$

The temperature employed need not be high, and it is preferably not sufficiently high to fuse the calcium chloride produced. For example, a temperature not exceeding 600° C. is suitable.

The ingredients may be present in the stoichiometric proportions or an excess of any one may be present, if desired.

Means are provided to seal the cupola at the top and bottom such as detachable covers 3 and 4 and an outlet 5 and transfer valve 6 are provided to enable the vapours of sodium metal and the carbon monoxide to be withdrawn through branch pipes 7 or 8 connected respectively to chambers 9 and 10 by means of an air pump (not shown) which may maintain a suitably low pressure, for example, 20–50 millimetres of mercury. The air pump is connected to chambers 9 and 10 by pipes 11 and 12 through transfer valve 17 whose actuating mechanism is interconnected to that of valve 6 as shown in Fig. 2. Chambers 9 and 10 have valved outlets 18 and 19.

In whichever of chambers 9 or 10 is in use, the vapours are contacted by a shower of water from sprays 13 and 14 which reacts with and dissolves the sodium in the form of caustic soda. It may be desirable to employ for this purpose a dilute solution of caustic soda which is thereby enriched to a strength rendering its subsequent evaporation economical or even unnecessary. When the cupola has been charged up and sealed, the water shower is set in operation by starting up the circulating pumps 15 or 16 and the air pump is started up. As soon as the pressure has fallen to about 50 millimetres of mercury, high frequency oscillations are set up in coil 2 to heat up the charge. After the reaction has taken place in one chamber 15 or 16 the pump in the other is started up and the valves 6 and 17 changed over. The solution of caustic soda may then be run off and, if sufficiently concentrated, allowed to solidify by cooling. When the charge in the cupola is exhausted, the calcium chloride and any ashes from the coke remaining at the bottom can be readily removed by unsealing the bottom cover 3.

Instead of employing water sprays, the vapours may be led beneath the surface of absorbing liquid in chambers 9 and 10. The circulating pumps 15 and 16 can then be dispensed with. By passing the vapours through a condenser the metallic sodium may be liquefied or solidified and collected under oil or other air excluding medium.

It is obvious that the invention may also be carried out in a horizontal vessel, if desired, and that by using potassium chloride, metallic potassium or caustic potash may be obtained. In place of coke, graphite or other electrically conducting carbonaceous materials or other electrically conducting reducing material, such as ferrosilicon, may be used. In place of lime (quick lime or hydrated lime), limestone, dolomite, magnesia, magnesite or other non-volatile basic medium may be employed.

Finally, if desired, other salts of alkali metals, such as the sulphate, may be used.

The pressure need not be so low as 50 mm. Other pressures have been found suitable e. g. up to half an atmosphere but lower pressures are more desirable.

I declare that what I claim is:

1. The method which comprises generating in a mixture of sodium chloride, lime and a solid reducing agent which is a conductor of electricity eddy currents sufficient to raise the temperature to a point at which reaction takes place with liberation of sodium, excluding air and maintaining a reduced pressure during said reaction and removing a vapour containing sodium from the reaction zone.

2. The method which comprises generating in a mixture of an alkali metal mineral acid salt selected from the group consisting of chlorides and sulphates, a non-volatile base and a solid reducing agent which is a conductor of electricity, eddy currents sufficient to raise the temperature to a point at which reaction takes place with liberation of alkali metal excluding air and maintaining a reduced pressure during said reaction and removing the vapours of alkali metal from the reaction zone.

3. The method which comprises generating in a mixture of a sodium mineral acid salt selected from the group consisting of chlorides and sulphates, a non-volatile base and a solid reducing agent which is a conductor of electricity, eddy currents sufficient to raise the temperature to a point at which reaction takes place with liberation of sodium excluding air and maintaining a reduced pressure during said reaction and removing a vapour containing sodium from the reaction zone.

4. The method which comprises heating together by high frequency induction sodium chloride, a non-volatile base and electrically conductive carbon with exclusiion of air and under reduced pressure and withdrawing vapours containing sodium from the reaction mixture.

5. The method which comprises bringing about a reaction under reduced pressure and with exclusion of air between the components of a mixture of alkali metal mineral acid salt selected from the group consisting of chlorides and sulphates, a non-volatile base and a solid reducing agent which is a conductor of electricity by bringing said mixture into the field of a high frequency oscillating circuit and withdrawing vapours containing the alkali metal from the reaction mixture.

6. The method which comprises bringing about a reaction between sodium chloride, lime and coke by heating them together by high frequency induction with exclusion of air and under reduced pressure and withdrawing vapours containing sodium vapour.

7. The method which comprises bringing about a reaction between sodium chloride, a non-volatile base and coke in dry admixture by inducing eddy currents in such mixture with exclusion of air and under reduced pressure and withdrawing vapours containing sodium vapour.

8. The method which comprises bringing about a reaction between sodium chloride, lime and coke by heating them together by high frequency induction with exclusion of air and under reduction of pressure withdrawing vapours containing sodium and contacting such vapours with water to form caustic soda.

THOMAS WOOD.